(12) United States Patent
Agarwal et al.

(10) Patent No.: US 8,311,882 B2
(45) Date of Patent: Nov. 13, 2012

(54) SYSTEM AND METHOD FOR FORECASTING AN INVENTORY OF ONLINE ADVERTISEMENT IMPRESSIONS FOR TARGETING IMPRESSION ATTRIBUTES

(75) Inventors: Deepak K. Agarwal, Sunnyvale, CA (US); Peiji Chen, Saratoga, CA (US); Victor K. Chu, Milpitas, CA (US); Donald Swanson, Mountain View, CA (US); Mark Sordo, Santa Cruz, CA (US); Long-Ji Lin, San Jose, CA (US); Danny Zhang, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 740 days.

(21) Appl. No.: 12/261,933

(22) Filed: Oct. 30, 2008

(65) Prior Publication Data

US 2010/0114710 A1    May 6, 2010

(51) Int. Cl.
*G06Q 30/00* (2006.01)
(52) U.S. Cl. ..................................................... 705/14.1
(58) Field of Classification Search .................. 705/14.1
See application file for complete search history.

(56) References Cited

U.S. PATENT DOCUMENTS

2009/0037267 A1* 2/2009 Duggal et al. ................. 705/14

* cited by examiner

*Primary Examiner* — Daniel Lastra
(74) *Attorney, Agent, or Firm* — Michael J. Buchenhorner

(57) ABSTRACT

An improved system and method for forecasting an inventory of online advertisement impressions for targeting profiles of attributes is provided. An index of advertisement impressions on display advertising properties may be built for a targeting profile of attributes from forecasted impression pools. Impression pools of advertisements sharing the same attributes and trend forecast data for web pages and advertisement placements on the web pages may be integrated to generate the forecasted impression pools. An index of several index tables may be generated from forecasted impression pools. A query may be submitted to obtain an inventory forecast of advertisement impressions for targeting profiles of attributes and the index may be searched to match forecasted impression pools for the targeted profile of attributes. Then the inventory forecast of advertisement impressions on display advertising properties may be returned as query results for the targeting profile of attributes.

16 Claims, 4 Drawing Sheets

US 8,311,882 B2

SYSTEM AND METHOD FOR FORECASTING AN INVENTORY OF ONLINE ADVERTISEMENT IMPRESSIONS FOR TARGETING IMPRESSION ATTRIBUTES

FIELD OF THE INVENTION

The invention relates generally to computer systems, and more particularly to an improved system and method for forecasting an inventory of online advertisement impressions for targeting impression attributes.

BACKGROUND OF THE INVENTION

A major problem faced by an online advertising publisher is to forecast available inventory of advertisement impressions for sale to online advertisers. Online advertisers would like to target users visiting certain web pages with certain demographics, geographies, behavioral interests, as well as many other attributes. For example, an advertiser may want to target users in a publisher's website with the following profile: female, over 30 years old, with a behavioral interest in home improvement. Thus an online advertising publisher needs to make accurate forecasts for any combination of those attributes efficiently.

The problem of forecasting available inventory of advertisement impressions for sale to online advertisers that are untargeted is considerably easier to solve since it involves predicting available advertisement impressions for each advertising property managed by the online publisher. One method of solving this problem is described in U.S. Pat. No. 6,801,945, entitled "SYSTEMS AND METHODS FOR PREDICTING TRAFFIC ON INTERNET SITES". However, the problem of forecasting available inventory of advertisement impressions for targeting profiles of attributes is complicated by the fact that there may be thousands of targeting attributes. The greater the number of advertising properties managed by the online publisher the more complicated the problem becomes to forecast the thousands of targeting attributes across the advertising properties.

What is needed is a way for an online publisher to forecast available inventory of online advertisement impressions for targeting profiles of attributes. Such a system and method should be able to make accurate forecasts for any combination of those attributes in a fraction of a second.

SUMMARY OF THE INVENTION

Briefly, the present invention provides a system and method for forecasting an inventory of online advertisement impressions for targeting impression attributes. An impression inventory forecaster may be provided that receives queries from an application to obtain an inventory forecast of advertisement impressions for targeting impression attributes and returns the inventory forecast of the advertisement impressions to the application for targeting impression attributes. A searchable index of advertisement impressions available on display advertising properties may be built for a targeting profile of attributes from forecasted impression pools. Impression pools of advertisements that share the same attributes and trend forecast data for web pages and advertisement placements on the web pages may be integrated to generate the forecasted impression pools. A forecasted impression inventory indexer may generate an index of several index tables from forecasted impression pools to access trend data of forecasted impression inventory by attributes. The index may be searched to match forecasted impression pools for a targeting profile of attributes submitted in a query for a time period. An inventory forecast may be computed by summing a trend forecast during the time period for each matching forecasted impression pool. Then the inventory forecast of advertisement impressions available on display advertising properties during the time period may be returned as query results for the targeting profile of attributes.

In an embodiment to build an index of advertisement impressions available on display advertising properties for a targeting profile of attributes, historical impressions of advertisements served to online users may be retrieved from impression logs and impression pools with unique attributes may be created from impression logs. Samples of historical impressions may be extracted from the impression logs and assigned to impression pools. Trend forecast data may be retrieved for untargeted inventory forecasting of advertisement impressions, and impression pools of sample impressions may be matched to trend forecast data for display advertising properties to generate forecasted impression pools. An index of index tables may then be build for the forecasted impression pools. Once the index tables are built and stored, the data from the forecasted impression pools can be queried very efficiently.

The present invention may be used to forecast an inventory of online advertisement impressions to target many different profiles of attributes. For instance, user attributes for online behavior or demographics may be used for targeting user profiles. Or user profiles may be targeted by time, browser attribute or type, and so forth. The present invention may make accurate forecast for any combination of thousands of targeting attributes so that a market request for availability of advertisement impressions targeting profiles of attributes for a particular combination of targeting attributes may be efficiently forecasted.

Other advantages will become apparent from the following detailed description when taken in conjunction with the drawings, in which:

DETAILED DESCRIPTION

Exemplary Operating Environment

Figure 1:
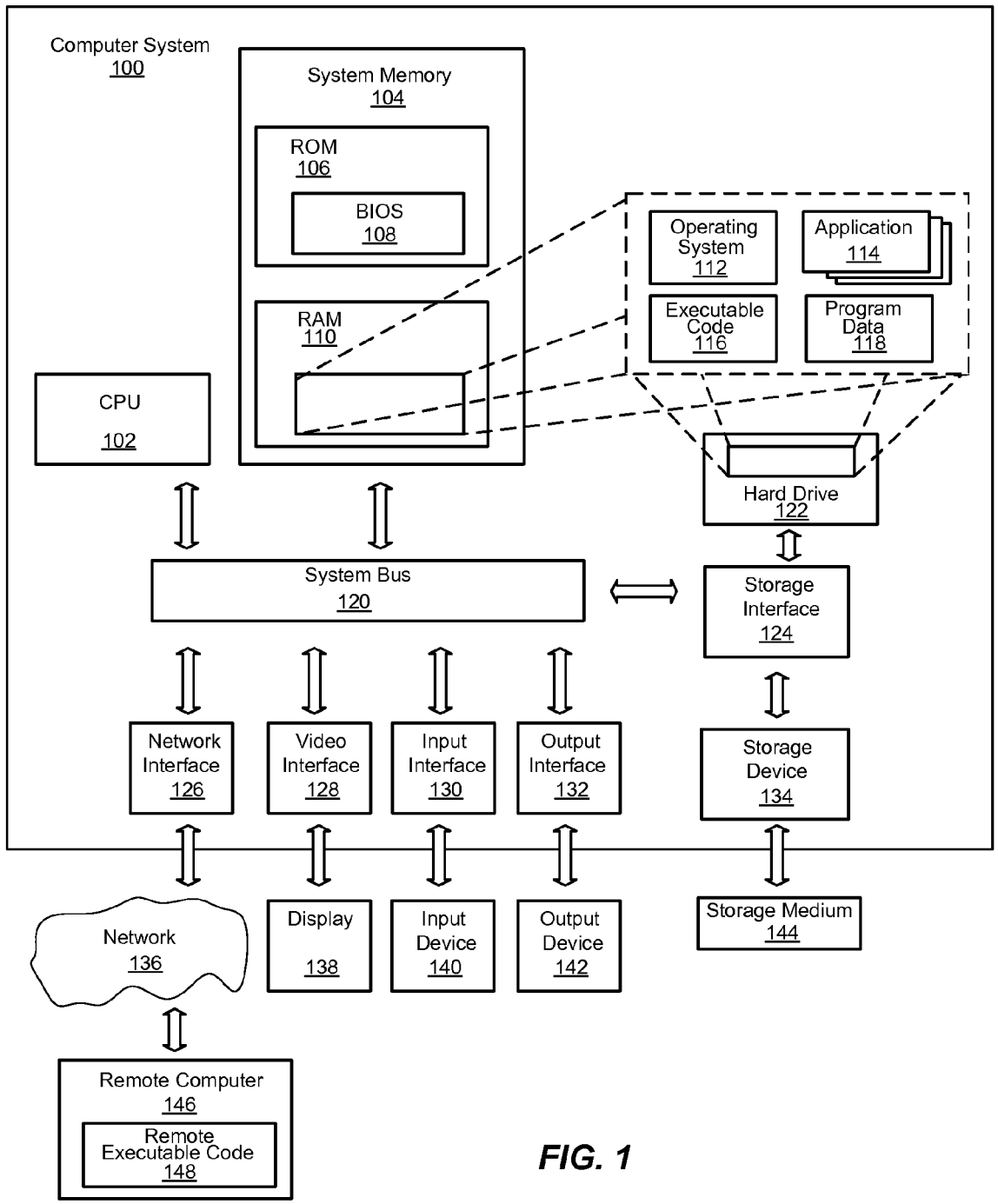
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used. Those skilled in the art will also appreciate that many of the components of the computer system 100 may be implemented within a system-on-a-chip architecture including memory, external interfaces and operating system. System-on-a-chip implementations are common for special purpose hand-held devices, such as mobile phones, digital music players, personal digital assistants and the like.

Forecasting an Inventory of Online Advertisement Impressions for Targeting Profiles of Attributes The present invention is generally directed towards a system and method for forecasting an inventory of online advertisement impressions for targeting profiles of attributes. An impression inventory forecaster may be provided that receives queries from an application to obtain an inventory forecast of advertisement impressions for targeting profiles of attributes and returns the inventory forecast of the advertisement impressions to the application for targeting profiles of attributes. As used herein, a targeting profile of attributes means one or more attributes associated with web page properties, with web browser properties, with one or more users including demographics, online behavior, and so forth. A searchable index of advertisement impressions available on display advertising properties may be built for a targeting profile of attributes from forecasted impression pools. A forecasted impression inventory indexer may generate an index of several index tables from forecasted impression pools to access trend data of forecasted impression inventory by attributes. The index may be searched to match forecasted impression pools for a targeting profile of attributes submitted in a query for a time period. An inventory forecast of advertisement impressions available on display advertising properties during the time period may be returned as query results for the targeting profile of attributes. As used herein, a display advertising property means a collection of related web pages that may have advertising space allocated for displaying advertisements.

As will be seen, a forecast of an inventory of online advertisement impressions may be generated to target many different profiles of attributes. Thus, the present invention may provide a publisher with the capability to forecast available inventories of advertisement impressions for targeting different combinations of attributes before selling them to online advertisers. As will be understood, the various block diagrams, flow charts and scenarios described herein are only examples, and there are many other scenarios to which the present invention will apply.

Figure 2:
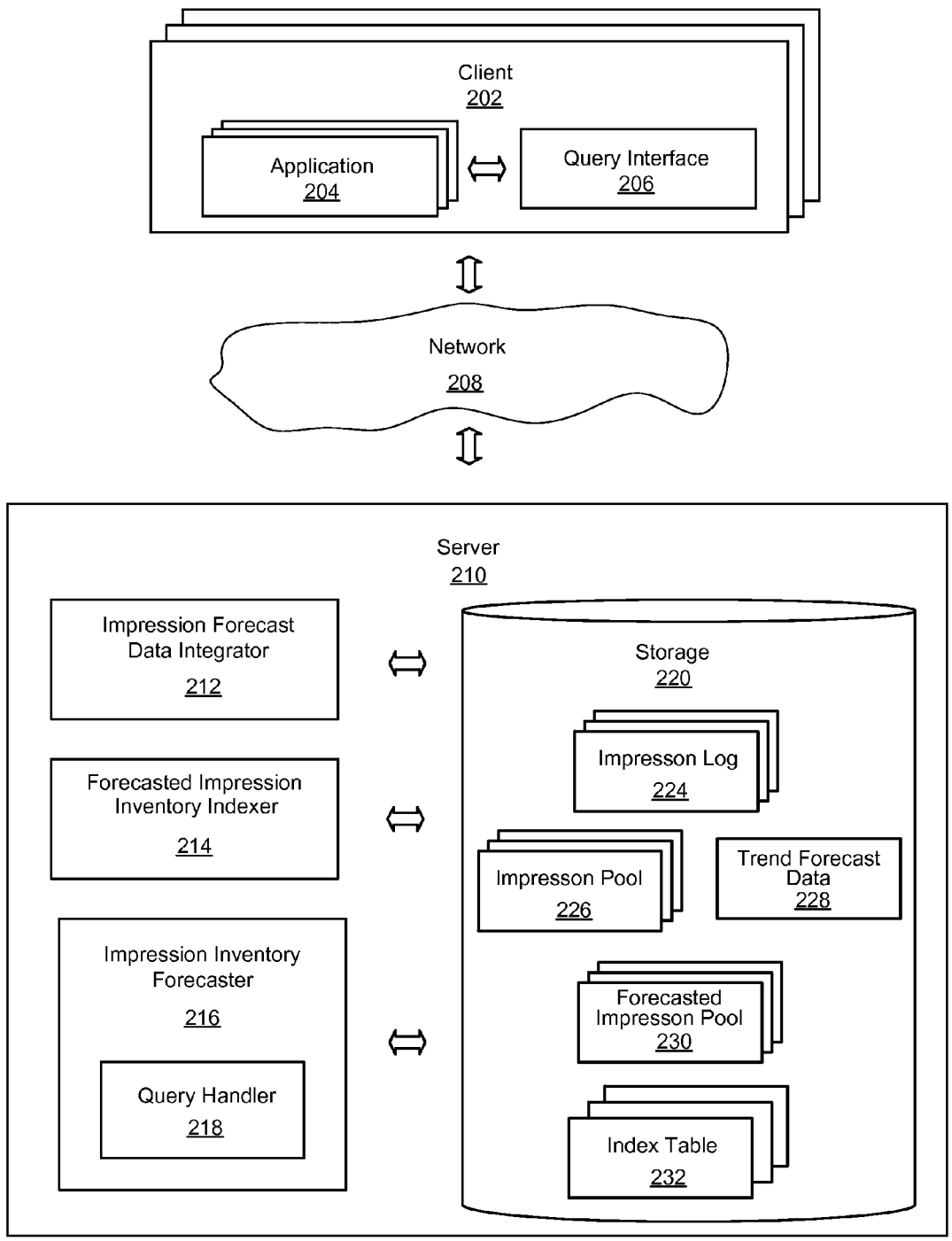
FIG. 2 is a block diagram generally representing an exemplary architecture of system components for forecasting an inventory of online advertisement impressions for targeting profiles of attributes, in accordance with an aspect of the present invention.

Turning to FIG. 2 of the drawings, there is shown a block diagram generally representing an exemplary architecture of system components for forecasting an inventory of online advertisement impressions for targeting profiles of attributes. Those skilled in the art will appreciate that the functionality implemented within the blocks illustrated in the diagram may be implemented as separate components or the functionality of several or all of the blocks may be implemented within a single component. For example, the functionality for the query handler 218 may be included in the same component as the impression inventory forecaster 216. Or the functionality of the query handler 218 may be implemented as a separate component. Moreover, those skilled in the art will appreciate that the functionality implemented within the blocks illustrated in the diagram may be executed on a single computer or distributed across a plurality of computers for execution.

In various embodiments, a client 202 may be operably coupled to one or more servers 210 by a network 208. The client computer 202 may be a computer such as computer system 100 of FIG. 1. The network 208 may be any type of network such as a local area network (LAN), a wide area network (WAN), or other type of network. One or more applications 204 may execute on the client computer 202 and may include functionality for receiving a query request which may be input by a user to obtain an inventory forecast of available advertisement impressions for targeting profiles of attributes. The application 204 may be operably coupled to a query interface 206 that may include functionality for receiving a query entered by a user and for sending a query request to a server to obtain an inventory forecast of available advertisement impressions for targeting profiles of attributes. In general, the application 204 and the query interface 206 may be any type of interpreted or executable software code such as a kernel component, an application program, a script, a linked library, an object with methods, and so forth. Each of these components may alternatively be a processing device such as an integrated circuit or logic circuitry that executes instructions represented as microcode, firmware, program code or other executable instructions that may be stored on a computer-readable storage medium. Those skilled in the art will appreciate that these components may also be implemented within a system-on-a-chip architecture including memory, external interfaces and an operating system.

The server 210 may be any type of computer system or computing device such as computer system 100 of FIG. 1. In general, the server 210 may provide services for building a searchable index of advertisement impressions available for targeting profiles of attributes and may include services for processing queries to obtain an inventory forecast of available advertisement impressions for targeting profiles of attributes. In particular, the server 210 may include an impression forecast data integrator 212 that may generate one or more forecasted impression pools 230 from impression pools 226 of advertisements that share the same attributes and trend forecast data 228 for web pages and advertisement placements on the web pages. The server 210 may also include a forecasted impression inventory indexer 214 that may generate an index of several index tables 232 from forecasted impression pools 230 to access trend data of forecasted impression inventory by attributes. The server 210 may additionally include an impression inventory forecaster 216 that receives queries to obtain an inventory forecast of available advertisement impressions for targeting profiles of attributes and returns an inventory forecast of available advertisement impressions for targeting profiles of attributes. The impression inventory forecaster 216 may include a query handler 218 for receiving and responding to query requests. Each of these components may also be any type of executable software code such as a kernel component, an application program, a linked library, an object with methods, or other type of executable software code. Each of these components may alternatively be a processing device such as an integrated circuit or logic circuitry that executes instructions represented as microcode, firmware, program code or other executable instructions that may be stored on a computer-readable storage medium. Those skilled in the art will appreciate that these components may also be implemented within a system-on-a-chip architecture including memory, external interfaces and an operating system.

The server 210 may be operably coupled to a computer-readable storage medium such as storage 220 that may store one or more impression logs 224, one of more impression pools 226, trend forecast data 228, one or more forecasted impression pools 230, an index of several index tables 232 from forecasted impression pools 230 to access trend data of forecasted impression inventory by attributes. In an embodiment, the impression logs 224 may include recorded information of advertisement impressions served. The recorded information may include a web page ID, a user ID, an advertisement ID, a timestamp, and other information such as a web browser ID. Each of the impression pools 226 represent a collection of advertisement impressions that share the same attributes. The information gathered from the logs and other lookup tables, such as page hierarchy tables and visitor attribute tables, that may be incorporated in an impression pool includes: web page attributes such as properties of the page and the web page position of an advertisement; visitor attributes such as age, gender, country, behavioral interests; time attributes such as date and hour of the day; and other attributes such as attributes of a browser. Each of the impression pools 226 may also include a count of the total number of impressions that share the same attributes. The trend forecast data 228 may be represented by an inventory trend forecast table with columns including a web page property or collection of related web pages, web page position of an advertisement, and the ratio of the number of forecasted impressions on a given date to the number of actual impressions on a reference date in the past. Each of the forecasted impression pools 230 represent an impression pool 226 tagged with a reference to trend forecast data. The information that may be incorporated in a forecasted impression pool 230 may include the information from the impression pool 226, such as web page attributes, user attributes, time attributes, and impression count, and a reference to trend forecast data such as a pointer to a row in the inventory trend forecast table.

In general, a searchable index of advertisement impressions available on display advertising properties may be built for a targeting profile of attributes. An impression forecast data integrator 212 may generate forecasted impression pools 230 from impression pools 226 of advertisements that share the same attributes and trend forecast data 228 for web pages and advertisement placements on the web pages. A forecasted impression inventory indexer 214 may generate an index of several index tables 232 from forecasted impression pools 230 to access trend data of forecasted impression inventory by attributes. Queries may then be submitted by an allocator to obtain a forecast of available advertisement impressions by accessing the index to match forecasted impression pools for a targeting profile of attributes. An inventory forecast may be computed by summing a trend forecast during the time period for each matching forecasted impression pool. Then the inventory forecast of advertisement impressions available on display advertising properties during the time period may be returned as query results for the targeting profile of attributes.

Figure 3:
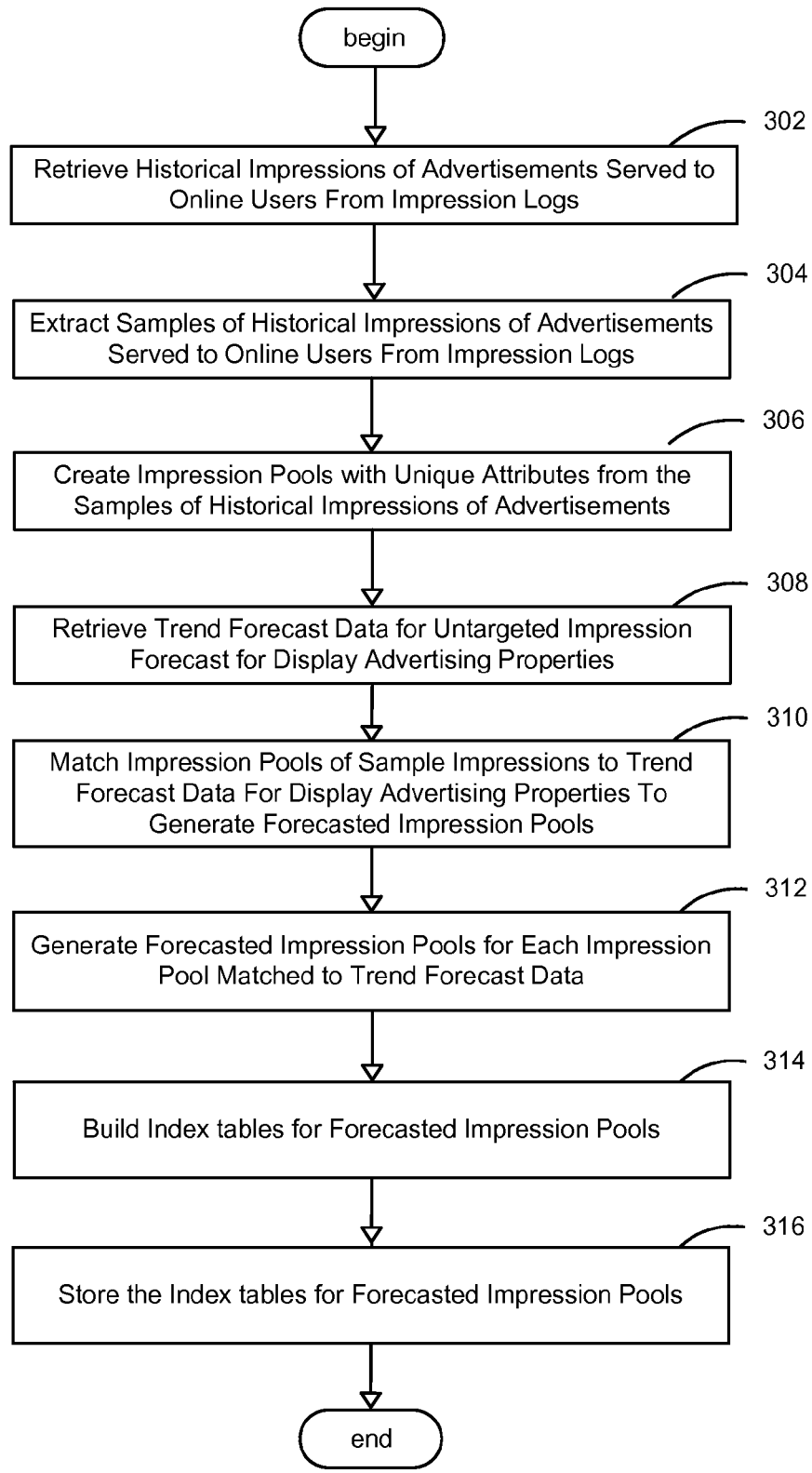
FIG. 3 is a flowchart for generally representing the steps undertaken in one embodiment for building a searchable index of advertisement impressions available on display advertising properties for targeting a profile of attributes, in accordance with an aspect of the present invention.

FIG. 3 presents a flowchart for generally representing the steps undertaken in one embodiment for building a searchable index of advertisement impressions available on display advertising properties for targeting a profile of attributes. At step 302, historical impressions of advertisements served to online users may be retrieved from impression logs. At step 304, samples of historical impressions may be extracted from the impression logs. To save storage and computation time, a subset of the impression logs may be processed and kept in an embodiment that may be used to generate a forecast of inventory of advertisement impressions for targeting profiles of attributes. For example, samples representing 4% of historical impressions may be used. At step 306, impression pools with unique attributes may be created from the samples extracted from the impression logs. An impression pool may be defined by attributes such as time attributes, user behavior attributes, web page attributes and so forth. In an embodiment, an impression pool may represent a collection of advertisement impressions that share the same attributes, such as web page attributes including properties of the web page and the web page position of an advertisement, visitor attributes such as age, gender, country, behavioral interests, time attributes such as date and hour of the day, and other attributes such as attributes of a browser. An impression pool may also include a count of the total number of impressions in the impression pool.

At step 308, trend forecast data may be retrieved for untargeted inventory forecasting of advertisement impressions. In an embodiment, the trend forecast data may be represented by an inventory trend table generated by applying time series analysis algorithms to historical impression counts as described in further detail by U.S. Pat. No. 6,801,945, entitled "SYSTEMS AND METHODS FOR PREDICTING TRAFFIC ON INTERNET SITES". At step 310, impression pools of sample impressions may be matched to trend forecast for display advertising properties in order to generate forecasted impression pools. In an embodiment, the attributes from an impression pool may be used to match a web page property or collection of related web pages in an inventory trend forecast table with columns including a web page property or collection of related web pages, web page position of an advertisement, and the ratio of the number of forecasted impressions on a given date to the number of actual impressions on a reference date in the past. For instance, an impression pool may include an attribute of real-estate property, since impressions in the pool may have been displayed on a real-estate display advertising property. The impression pool may then be matched to trend forecast data associated with an attribute of real-estate property such as a web page property or collection of related web pages for a real-estate display advertising property in an inventory trend forecast table. A forecasted impression pool may then be generated at step 312 for each impression pool matched to trend forecast data in an embodiment described in further detail by copending U.S. patent application Ser. No. 12/262,080, entitled "SYSTEM AND METHOD FOR GRANULAR INVENTORY FORECASTING OF ONLINE ADVERTISEMENT IMPRESSIONS", filed concurrently herewith and incorporated herein in it entirety. Each forecasted impression pool may include the information from an impression pool and a pointer to a row in the inventory trend table for a matching display advertising property.

At step 314, index tables may be built for the forecasted impression pools. In an application, there may be millions of forecasted impression pools, each of which may contain dozens or even hundreds of attributes. An efficient indexing technology known in the art, such as FastBit, may be used in an implementation to scan the forecasted impression pools and build an index table for each attribute value. For example, consider that there may be 6 million forecasted impression pools, each of which is assigned a unique identifier from 1 to 6 million. An indexer such as Fastbit may build an index table that is a bit vector for a single attribute value such as "gender=female." The bit vector may include a bit for each forecasted impression pool and accordingly be 6 million bits long. Each bit may be set to be either 1 or 0, indicating whether the corresponding impression pool contains the "gender=female" attribute. The indexer will build such bit vectors for all possible attribute values, such as "gender=male," "age=32," "behavior_interest=music," "hour_of_day=12," "country=US," and so forth. With a clever encoding scheme, FastBit is able to condense each long bit vector into a storage of far fewer than 6 million bits, saving both memory and processing time.

To illustrate how the query handler works, consider the following query: "gender=female and behavior_interest=music and country=US." First, the query handler may retrieve the three bit vectors (or index tables) corresponding to "gender=female," "behavior_interest=music," and "country=US." The query handler then performs a bit-wise "AND" operation on the three bit vectors. The output bit vector indicates all the forecasted impression pools that have all of these three attribute values. An indexer such as FastBit may also support a bit-wise "OR" operation.

Returning to FIG. 3, after index tables may be built for the forecasted impression pools, the index tables may be stored for the forecasted impression pools at step 316.

Figure 4:
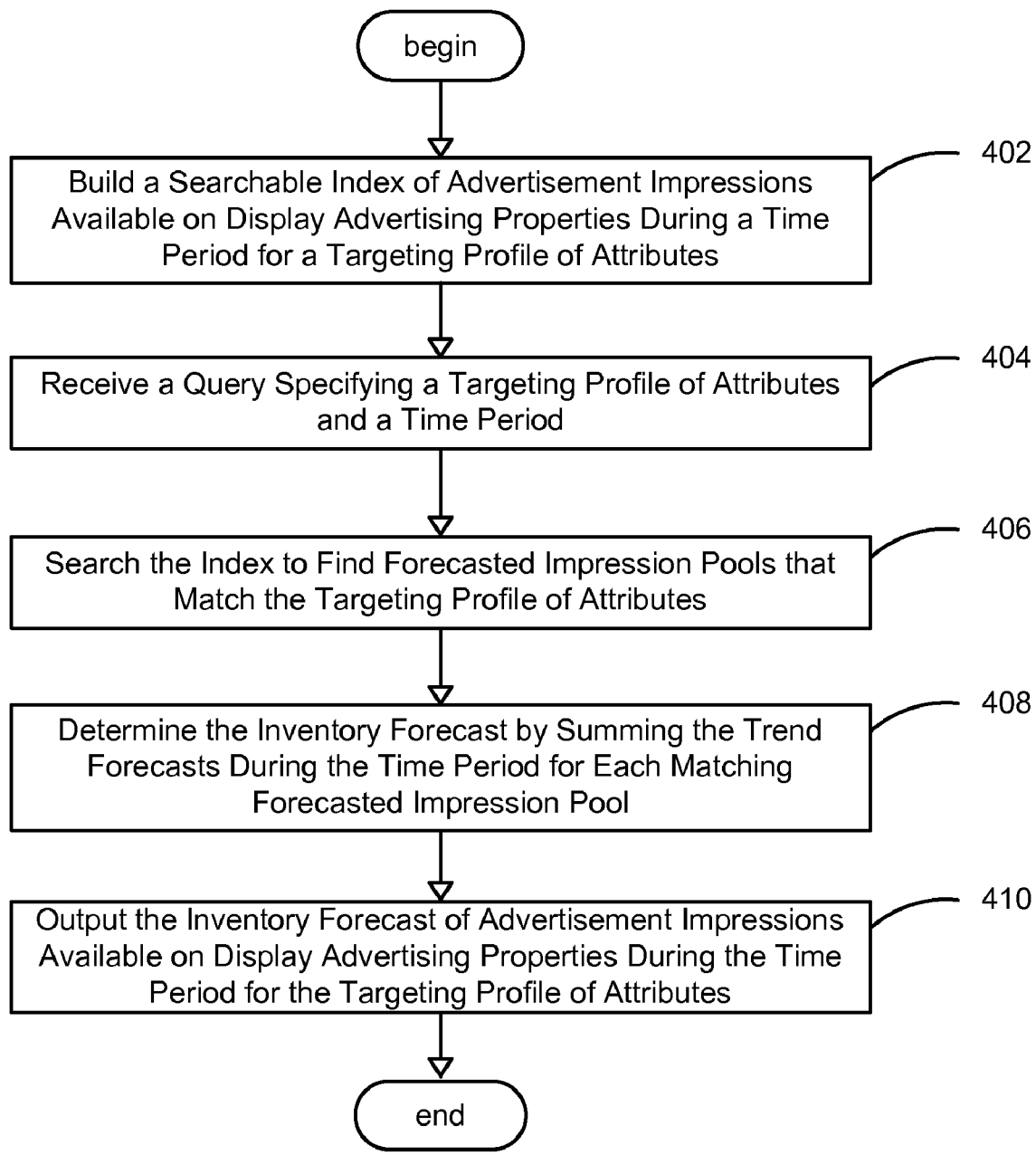
FIG. 4 is a flowchart for generally representing the steps undertaken in one embodiment for obtaining a forecast of advertisement impressions available on display advertising properties for targeting a profile of attributes, in accordance with an aspect of the present invention.

Once the index tables are built, the data can be queried very efficiently. FIG. 4 presents a flowchart for generally representing the steps undertaken in one embodiment for obtaining a forecast of advertisement impressions available on display advertising properties for targeting a profile of attributes. At step 402, a searchable index of forecasted advertisement impressions may be built that are available on display advertising properties. The steps described above in conjunction with FIG. 3 may be used in an embodiment for building the searchable index of forecasted advertisement impressions available in display advertising properties. At step 404, a query specifying a targeting profile of attributes and a time period may be received. For instance, a query may specify the following attributes of a targeting profile: "property=Finance", "age>30", and "country=US". The time period may be specified as a date range such as "7/1/2009 to 12/31/2009". At step 406, the index may be searched to find forecasted impression pools that match the targeting profile of attributes. An inventory forecast may be determined at step 408 by summing trend forecast data during the time period specified in the query for each matching forecasted impression pool. In an embodiment, for each date in the time period specified in the query, the trend forecast data may be computed for each matching impression pool and then it may be added to the total inventory forecast. In particular, the information in a forecasted impression pool may include the number of impressions on a given day in the past and the trend data such as a percent for a particular time period in the future. An inventory forecast may then be determined by multiplying the number of impressions for each of the corresponding days in the past in the time period by the percentage in the trend data and adding up the result for forecast numbers for a time period for the impression pool. At step 410, the inventory forecast of advertisement impressions available on display advertisement properties available during the time period may be output for targeting the profile of attributes. In addition to outputting a total count of available inventories of advertisement impression, the inventory of advertisement impressions or samples of the inventory of advertisement impressions may be output in an embodiment for each matching forecasted impression pool.

Importantly, the forecast of an inventory of online advertisement impressions may be generated to target many different profiles. For instance, web page attributes such as properties of the page and the web page position of an advertisement may be used. User attributes for online behavior and/or demographics including age, gender, and country, may be used for targeting profiles of attributes. Or profiles of attributes may be targeted by time, browser attribute or type, and so forth. The present invention may make accurate forecast for any combination of thousands of targeting attributes. Thus, the present invention may provide a publisher with the capability to forecast available inventories of advertisement impressions for targeting different combinations of attributes before selling them to online advertisers who, for instance, would like to target users visiting certain web pages with certain demographics, geographies, behavioral interests, as well as many other attributes. Those skilled in the art will appreciate that the present invention may be used to target any impression attributes including page attributes, user attributes, browser attributes, time attributes, and so forth. For example, a content match application may use the present invention for matching an advertisement to content of a web page. Or an application on a mobile device may use the present invention for matching an advertisement to browser attributes for a browser that may process a particular type of advertisement such as video, text, so forth.

As can be seen from the foregoing detailed description, the present invention provides an improved system and method for forecasting an inventory of online advertisement impressions for targeting user profiles. An index of advertisement impressions available on display advertising properties may be built for a targeting profile of users from forecasted impression pools. Impression pools of advertisements sharing the same attributes and trend forecast data for web pages and advertisement placements on the web pages may be integrated to generate the forecasted impression pools. A query may be submitted to obtain an inventory forecast of advertisement impressions for targeting user profiles and the index may be searched to match forecasted impression pools for the targeted profile of users. Then the inventory forecast of advertisement impressions on display advertising properties may be returned as query results for the targeting profile of attributes of users. Such a system and method may accurately and efficiently forecast availability of advertisement impressions targeting a user profiles for a particular combination of targeting attributes requested by online advertisers. As a result, the system and method provide significant advantages and benefits needed in contemporary computing and in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for forecasting an inventory of online advertising impressions, comprising:
   a processing device;
   memory operatively coupled with the processing device, said memory comprising following program modules comprising instructions executed by the processing device:
   an impression inventory forecaster performing:
      receiving a plurality of online queries to obtain an inventory forecast of a plurality of online advertisement impressions for target profiles of attributes specified in the plurality of queries; and
      returning the inventory forecast of the plurality of online advertisement impressions for the target profiles of attributes;
   a query handler operably coupled to the impression inventory forecaster receiving the plurality of online queries to obtain the inventory forecast of the plurality of online advertisement impressions for the target profiles of attributes; and
   a storage operably coupled to the impression inventory forecaster storing a plurality of index tables for finding trend forecast data of forecasted impression inventory indexed by a plurality of attributes from a plurality of forecasted impression pools.

2. The system of claim 1 further comprising an impression inventory indexer operably coupled to the storage that generates the plurality of index tables from the plurality of forecasted impression pools for finding trend forecast data of forecasted impression inventory indexed by the plurality of attributes.

3. The system of claim 1 further comprising an impression forecast data integrator operably coupled to the storage that generates the plurality of forecasted impression pools from a plurality of online impression pools and trend forecast data.

4. The system of claim 1 further comprising a query interface operably coupled to an application that sends the plurality of queries to the impression inventory forecaster to obtain the inventory forecast of the plurality of advertisement impressions for the target profiles of attributes.

5. A computer-implemented method for forecasting an inventory of online advertising impressions, comprising:
   using an input/output subsystem receiving a query specifying a target profile comprising a plurality of attributes and a time period;
   using a processor device performing:
      searching an index to find a plurality of forecasted impression pools that match both the target profile and the time period;
      determining an inventory forecast of online advertisement impressions on display advertising properties by summing a plurality of trend forecasts during the time period for each forecasted impression pool that matches; and
      outputting the inventory forecast of online advertisement impressions on display advertising properties during the time period for the targeting profile of the plurality of attributes.

6. The method of claim 5 wherein outputting the inventory forecast of online advertisement impressions on display advertising properties during the time period for the target profile of the plurality of attributes comprises sending the inventory forecast of online advertisement impressions on display advertising properties during the time period for the target profile of the plurality of attributes to an application executing on a client device.

7. The method of claim 5 wherein receiving the query specifying the target profile of the plurality of attributes and the time period further comprises receiving at least one web page attribute.

8. The method of claim 5 further comprising building the index to find the plurality of forecasted impression pools that match the target profile of the plurality of attributes and the time period.

9. The method of claim 8 further comprising storing the index to find the plurality of forecasted impression pools that match the target profile of the plurality of attributes and the time period.

10. The method of claim 8 wherein building the index to find the plurality of forecasted impression pools that match the target profile of the plurality of attributes and the time period comprises building a plurality of index tables, one index table for each attribute value of the plurality of forecasted impression pools.

11. The method of claim 8 wherein building the index to find the plurality of forecasted impression pools that match the target profile of the plurality of attributes and the time period comprises retrieving a plurality of historical impressions of a plurality of advertisements served to a plurality of online users from a plurality of impression logs.

12. The method of claim 11 further comprising creating a plurality of impression pools with a plurality of unique attributes from the plurality of impression logs.

13. The method of claim 12 further comprising extracting a plurality of sample impressions of advertisements from the plurality of impression logs.

14. The method of claim 13 further comprising assigning the plurality of sample impressions of advertisements from the plurality of impression logs to the plurality of impression pools.

15. The method of claim 14 further comprising retrieving trend forecast data for untargeted inventory forecasting of a plurality of advertisement impressions and matching the trend forecast data for untargeted inventory forecasting of the plurality of advertisement impressions to the plurality of impression pools of sample impressions.

16. The method of claim 5 wherein determining an inventory forecast of advertisement impressions on display advertising properties by summing a plurality trend forecasts during the time period for each forecasted impression pool that match comprises multiplying a size of a forecasted impression pool that match trend forecast data for untargeted inventory forecasting of the plurality of advertisement impressions by the trend forecast data for the untargeted inventory forecasting.

* * * * *